United States Patent

Horton et al.

[11] 4,114,352
[45] Sep. 19, 1978

[54] PROTECTIVE JACKET FOR CHRONICALLY INSTRUMENTED DOGS

[75] Inventors: Michael L. Horton, Greene County, Ohio; Alan M. Harris, Aurora, Colo.

[73] Assignee: The United States of America as represented by the Secretary of the Air Force, Washington, D.C.

[21] Appl. No.: 706,316

[22] Filed: Jul. 19, 1976

[51] Int. Cl.² .............. B68C 5/00; A01K 27/00; A01K 29/00
[52] U.S. Cl. .................... 54/79; 2/DIG. 7; 119/143; 119/106; 128/418; 128/465; D30/37
[58] Field of Search ........ 54/79, 80; 119/143, 119/96, 106; 128/DIG. 4, 2.06 E, 2.1 E, 410, 411, 418, 379, 82.1, 171, 1 A, 2 R, 96, 89 R, 465; 2/1, 45, 247, DIG. 7, 92; D30/37, 38, 39

[56] References Cited

U.S. PATENT DOCUMENTS

| 199,027 | 1/1878 | Bullock | 128/465 |
|---|---|---|---|
| 351,893 | 11/1886 | Wing | 2/1 |
| 373,699 | 11/1887 | Stewart | 2/45 |
| 718,896 | 1/1903 | Ames et al. | D30/37 |
| 1,612,945 | 1/1927 | Rieck | D30/37 |
| 2,072,030 | 2/1937 | Damron | 2/247 |
| 2,273,706 | 2/1942 | Hafner | 54/79 |
| 2,437,628 | 3/1948 | Warren | 119/106 |
| 3,053,250 | 9/1962 | Stubbs | 128/379 |
| 3,534,727 | 10/1970 | Roman | 128/2.06 E |
| 3,595,218 | 7/1971 | Kirkpatrick | 128/2.06 E |
| 3,742,679 | 7/1973 | Jordan | 54/79 |
| 3,751,727 | 8/1973 | Shepard et al. | 128/1 A |
| 3,753,421 | 8/1973 | Peck | 119/106 |
| 3,895,628 | 7/1975 | Adair | 54/79 |

FOREIGN PATENT DOCUMENTS 490,219  1/1930  Fed. Rep. of Germany .......... 119/106

OTHER PUBLICATIONS

Outdoor Life; Oct. 1964.
"A Device for Continuous Intravenous Fluid Injections in Dogs", George W. Branham, Laboratory Animal Science, vol. 26, No. 1, pp. 75–77.

Primary Examiner—Clyde I. Coughenour
Attorney, Agent, or Firm—Joseph E. Rusz; Richard J. Killoren

[57] ABSTRACT

A protective jacket having a body member adapted to cover a dog from the thoracic inlet to the last rib. Lacing is provided to adjust the jacket to accommodate different size dogs. Adjustable gussets are provided to accommodate various dog contours. A full length zipper permits easy removal of the jacket. A zippered oval back pouch on the jacket provides for protection of test leads and test instrumentation.

2 Claims, 4 Drawing Figures

U.S. Patent   Sept. 19, 1978   4,114,352
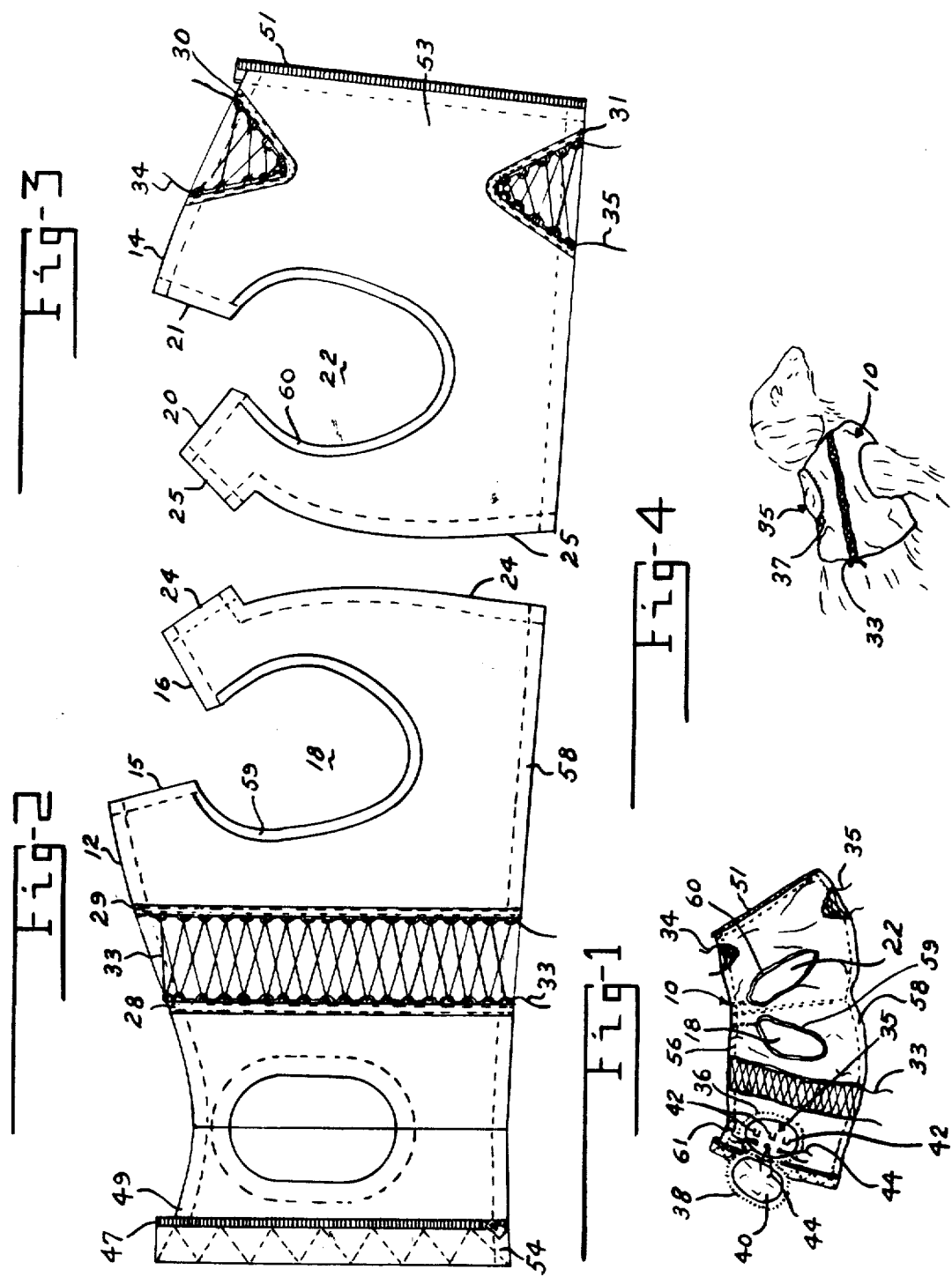

4,114,352

PROTECTIVE JACKET FOR CHRONICALLY INSTRUMENTED DOGS

RIGHTS OF THE GOVERNMENT

The invention described herein may be manufactured and used by or for the Government of the United States for all governmental purposes without the payment of any royalty.

BACKGROUND OF THE INVENTION

This invention relates to a protective jacket for a chronically instrumented dog.

When various tests, such as cardiac implantations, are made on dogs, or other animals, the leads and instrumentation used in these tests must be protected from rejection by the animal during the experiments. Stockinettes have been used to protect the leads and instrumentation but have proved inadequate.

BRIEF SUMMARY OF THE INVENTION

According to this invention, a jacket was made to cover a dog from the thoracic inlet to the last rib. Lacing is provided so that the jacket can be made to accommodate various size dogs. Gussets with lacing are provided so that the jacket can be made to accommodate various dog contours. A full length zipper is provided to permit easy removal of the jacket. An oval back pouch is positioned on the back of the jacket to provide protection for the leads and instrumentation used in tests. Holes are provided in the jacket to permit passage of the leads or other connectors into the back pouch. The connectors, as well as any instrumentation connected thereto, are secured in the pouch with nylon cords. A cover for the pouch is made of a high strength material to keep the animal from chewing the leads and instrumentation. The cover is secured to the jacket. A zipper is provided for closing the pouch.

IN THE DRAWING

FIG. 1 is a plan view of a dog jacket according to the invention.

FIG. 2 is an enlarged partially schematic plan view of one part of the jacket of FIG. 1.

FIG. 3 is an enlarged partially schematic plan view of another part of the jacket of FIG. 1.

FIG. 4 shows the jacket of FIG. 1 in place on a dog.

DETAILED DESCRIPTION OF THE INVENTION

Reference is now made to FIG. 1 of the drawing which shows a protective dog jacket 10, made up of parts 12 and 14, as shown in FIGS. 2 and 3. Edges 15 and 16, of part 12, are sewed together to form one leg opening 18. Edges 20 and 21 are sewed together to form the other leg opening 22. Edges 24 and 25 are sewed together to form the jacket, shown in FIG. 1. Eyelet ribbons 28, 29, 30 and 31 are sewed onto the jacket parts 12 and 14. Nylon cord 33 is threaded into the eyelets on ribbons 28 and 29 to permit adjustment in the size of the jacket to accommodate dogs of different size. Nylon cords 34 and 35 are threaded into the eyelets on ribbons 30 and 31 to adjust the jacket for different body contours of the dogs.

A back pouch 35 is formed by sewing a zipper tape 36, forming one part of zipper 37, in an oval pattern on the back of the jacket at a position corresponding to the withers. A second zipper tape 38, which forms the other part of zipper 37, is sewed onto a pouch cover 40. The pouch cover 40 is made of a tough high strength material, to keep the animal from chewing the connectors and the instrumentation located in the pouch. Notches 42 are cut in the jacket fabric, inside the ring formed by zipper tape 36, to provide a passage for test leads into the pouch. Nylon ties 44 are provided to secure the leads and instrumentation within the pouch. One part 47 of the jacket closure zipper is sewed to the jacket at edge 49, with the other part 51 of the closure zipper being sewed to the jacket at edge 53. A cotton shield flap 54 is sewed to the jacket adjacent zipper part 47 to reduce the chance of catching the dog hair in the zipper.

Reinforcement tapes 56 and 58 are sewed onto the front and back edges of the jacket. Binding tapes 59 and 60 are sewed to the jacket around the leg holes. A leash ring 61 is attached to the jacket and tape 56 near the pouch 35.

One jacket constructed was made with 8 ½ oz/sq yd nylon mesh, the pouch cover was made with 20 oz/sq yd nylon fabric. The zippers used were conventional high strength zippers. The lacing was one-hundred lb test nylon cord. Two inch wide nylon webbing was used for the reinforcement tapes. The binding tape was conventional binding material. Other materials than those described above have been used in some jackets constructed.

Before the jacket is used, it is placed on the dog, as shown in FIG. 4, and the ties 33, 34 and 35 are adjusted to fit the jacket to the dog. After cardiac implantation, the test leads are made to emerge from the skin of the dog between the scapulas. The jacket is then again placed on the dog and the leads are passed through notches 42 into the pouch. The desired instrumentation is then connected to the leads and the leads and instruments are tied down with ties 44. Zipper 37 is then closed to secure the leads and instrumentation within the pouch.

While the jacket has been described for use with dogs, it could also be used with certain other animals with similar body conformation. Also, the jacket can be used to protect the connectors for various tests on animals.

There is thus provided a light weight protective jacket for dogs which permits easy access to instrumentation and which will provide protection for the leads and the instrumentation used in tests on the dog.

We claim:

1. A protective jacket for a test animal comprising: a body member adapted to fit around the front part of the test animal; said body member having two holes adapted to receive the front legs of the test animal; fastener means for holding the jacket on the animal; means, on said jacket for adjusting the jacket for different animal body sizes; means on said jacket for adjusting the jacket for different animal body contours; a pouch on said jacket adapted to be positioned adjacent the withers of the test animal; means in said pouch for providing a passage for animal instrumentation leads into said pouch; means for securing instruments and instrumentation leads within said pouch; said pouch having a tear resistant cover; means for closing the cover on said pouch; said means for adjusting the jacket for different animal body sizes includes means for supporting a first row of eyelets on the outside of the jacket, extending from the front to the back of the jacket; means for supporting a second row of eyelets on the outside of the jacket substantially parallel to said first row, said second row of eyelets being spaced from first row of eyelets; means, passing through said eyelets for drawing said first row of eyelets toward said second row of eyelets to thereby reduce the size of the jacket; said means for adjusting the jacket for different animal body contours includes means for supporting a first group of eyelets in a V-shaped pattern at the forward portion of the jacket; means for supporting a second group of eyelets in a V-shaped pattern at rearward portion of the jacket; means, passing through said eyelet for drawing one side of each V-shaped pattern toward the other side of the corresponding V-shaped pattern to thereby adjust the jacket to the body contour of the animal.

2. The device as recited in claim 1 wherein said means for closing the cover on the pouch includes a zipper; said zipper having one part secured in an oval pattern on the back of the jacket at the position, adapted to be positioned adjacent the withers of the test animal, and another part secured to the pouch cover.

* * * * *